United States Patent
Keating (10) Patent No.: US 11,255,202 B2
(45) Date of Patent: Feb. 22, 2022

(54) DIFFUSER SPACE FOR A TURBINE OF A TURBOMACHINE

(71) Applicant: Cummins Ltd, Huddersfield (GB)

(72) Inventor: Jon-Luke Keating, Huddersfield (GB)

(73) Assignee: CUMMINS LTD, Huddersfield (GB)

( * ) Notice: Subject to any disclaimer, the term of this patent is extended or adjusted under 35 U.S.C. 154(b) by 0 days.

(21) Appl. No.: 16/634,726

(22) PCT Filed: Jul. 30, 2018

(86) PCT No.: PCT/GB2018/052157
§ 371 (c)(1),
(2) Date: Jan. 28, 2020

(87) PCT Pub. No.: WO2019/021027
PCT Pub. Date: Jan. 31, 2019

(65) Prior Publication Data
US 2020/0217212 A1    Jul. 9, 2020

(30) Foreign Application Priority Data
Jul. 28, 2017   (GB) ..................................... 1712182

(51) Int. Cl.
*F01D 9/02*    (2006.01)
*F02B 37/02*   (2006.01)

(52) U.S. Cl.
CPC ............ *F01D 9/026* (2013.01); *F02B 37/025* (2013.01); *F05D 2220/40* (2013.01); *F05D 2250/51* (2013.01); *F05D 2250/52* (2013.01)

(58) Field of Classification Search
CPC .... F01D 9/026; F02B 37/025; F05D 2220/40; F05D 2250/00; F05D 2250/50; F05D 2250/51; F05D 2250/52
See application file for complete search history.

(56) References Cited

U.S. PATENT DOCUMENTS 3,292,364 A  *  12/1966  Cazier ..................... F01D 9/045
                                                            417/380
4,776,168 A      10/1988  Woollenweber
(Continued)

FOREIGN PATENT DOCUMENTS

DE    202013103700 U1   10/2013
EP        1584796 A2    10/2005
(Continued)

OTHER PUBLICATIONS

International Search Report and Written Opinion issued by the European Patent Office, dated Oct. 29, 2018, for International Application No. PCT/GB2018/052157; 8 pages.
(Continued)

*Primary Examiner* — Jesse S Bogue
(74) *Attorney, Agent, or Firm* — Faegre, Drinker, Biddle & Reath, LLP (57) ABSTRACT

A turbine housing defining a pair of volutes with respective outlets divided by a divider wall, includes a diffuser space in the gas flow path between the volutes and the turbine wheel. The diffuser space has an upstream portion having a smaller axial extent than a downstream portion of the diffuser space. The widening of the diffuser space tends to direct exhaust gas entering the diffusion space from at least one side of the divider wall towards the corresponding axial end of the diffuser space. Thus reduces the tendency of this gas to interrupt the flow into the diffuser space of exhaust gas from the other inlet volute.

10 Claims, 6 Drawing Sheets

(56) References Cited

U.S. PATENT DOCUMENTS

| | | | | |
|---|---|---|---|---|
| 8,147,186 | B2* | 4/2012 | Ibaraki | F04D 29/441 |
| | | | | 415/148 |
| 8,480,360 | B2* | 7/2013 | Wang | F01D 17/14 |
| | | | | 415/205 |
| 9,399,923 | B2* | 7/2016 | Brinkert | F01D 9/026 |
| 9,562,442 | B2* | 2/2017 | Yoshida | F01D 25/24 |
| 9,587,554 | B2* | 3/2017 | Hoshi | F02B 37/025 |
| 2003/0053910 | A1 | 3/2003 | Hosny | |
| 2010/0229551 | A1 | 9/2010 | Wu et al. | |
| 2013/0283787 | A1 | 10/2013 | Sakata et al. | |
| 2014/0294577 | A1 | 10/2014 | Yoshida et al. | |
| 2014/0298799 | A1 | 10/2014 | Wu et al. | |

FOREIGN PATENT DOCUMENTS

| | | |
|---|---|---|
| EP | 1710415 A1 | 10/2006 |
| GB | 2001397 A | 1/1979 |
| JP | S633090724 A | 12/1988 |

OTHER PUBLICATIONS

Search Report issued by the United Kingdom International Property Office, dated Dec. 20, 2017, for Application No. GB1712182.3; 4 pages.

* cited by examiner

Equal admission  Unequal admission (a) MFR=0.5

(b) MFR>0.5

DIFFUSER SPACE FOR A TURBINE OF A TURBOMACHINE

CROSS-REFERENCE TO RELATED APPLICATIONS

The present application is a national stage entry of International (PCT) Patent Application Number PCT/GB2018/052157, filed Jul. 30, 2018, which in turn claims priority to British Patent Application No. 1712182.3, filed Jul. 28, 2017, the subject matter of which are expressly incorporated herein by reference.

FIELD OF THE INVENTION

The present invention relates to a turbine housing defining two exhaust gas inlet volutes.

BACKGROUND OF THE INVENTION

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are well known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

Figure 1:
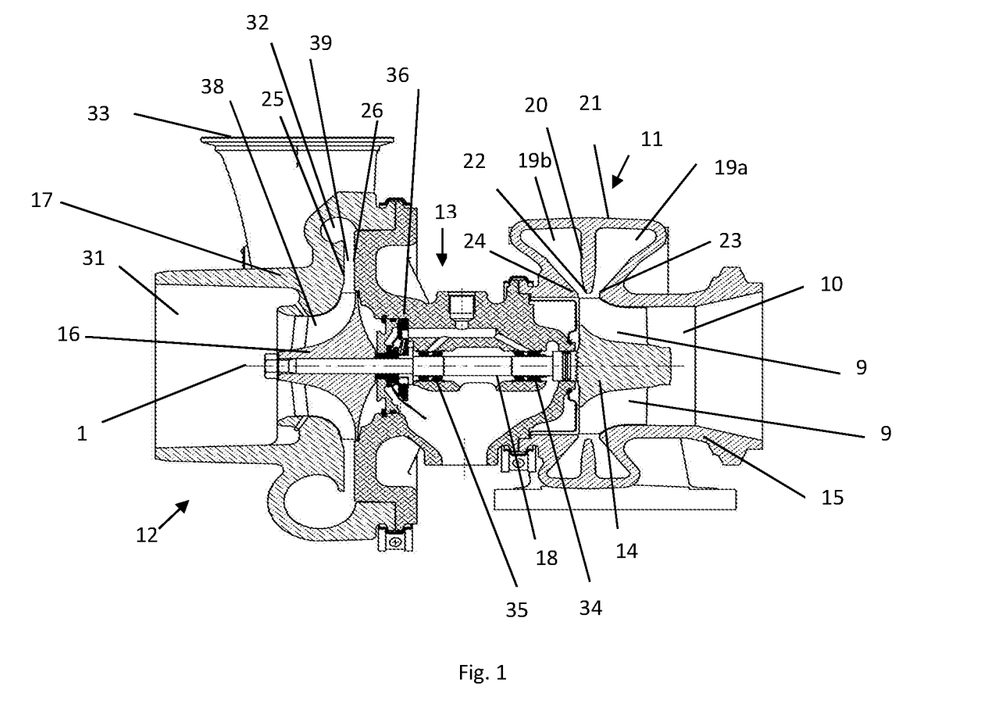
FIG. 1 is a cross-sectional drawing of a known turbocharger.

FIG. 1 shows a schematic cross-section through a known turbocharger. The turbocharger comprises a turbine 11 joined to a compressor 12 via a central bearing housing 13. The turbine 11 comprises a turbine wheel 14 for rotation within a turbine housing 15. The turbine wheel 14 has a rotational axis 1 (in the plane of the diagram) and blades 9. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13. The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36.

The turbine housing 15 has two exhaust gas inlet volutes 19a, 19b located annularly around the turbine wheel 14, and an axial exhaust gas outlet 10. The volutes 19a, 19b are symmetrical with respect to each other in a mirror plane perpendicular to the axial direction (note that in other known turbine housings the volutes are not symmetrical; furthermore in "double entry" turbines the volutes are circumferentially spaced, such as by 180 degrees, about the rotational axis 1 of the turbine). The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to here as a "diffuser") which is a gap between a radially-extending shroud surface 25 of the housing 17, and a radially extending hub surface 26 of the bearing housing 13. The diffuser 39 is rotationally symmetric about the rotational axis 1 of the shaft 18.

In use, exhaust gas is provided to the two exhaust gas inlet volutes 19a, 19b from an exhaust manifold (also referred to as an outlet manifold) of the engine (not shown) to which the turbocharger is attached. The inlet volutes 19a, 19b are divided by a divider wall 20 which extends radially inwardly from the radially outer wall 21 of the turbine housing 15, to a tip 22. The exhaust gas exits volute 19a through a gap between the tip 22 of the divider wall 20 and a first shroud surface 23 of the turbine 11. The exhaust gas exits volute 19b through a gap between the tip 22 of the divider wall 20 and a second shroud surface 24 of the turbine 11. Thus, the exhaust gas passes from the exhaust gas inlet volutes 19a, 19b to the exhaust gas outlet 10 via a turbine wheel 14, which is rotated by the exhaust gas. In variants, the second shroud 24 surface may be provided as a surface of the bearing housing or some other component, instead of being a surface of the turbine housing 15.

The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

Figure 2:
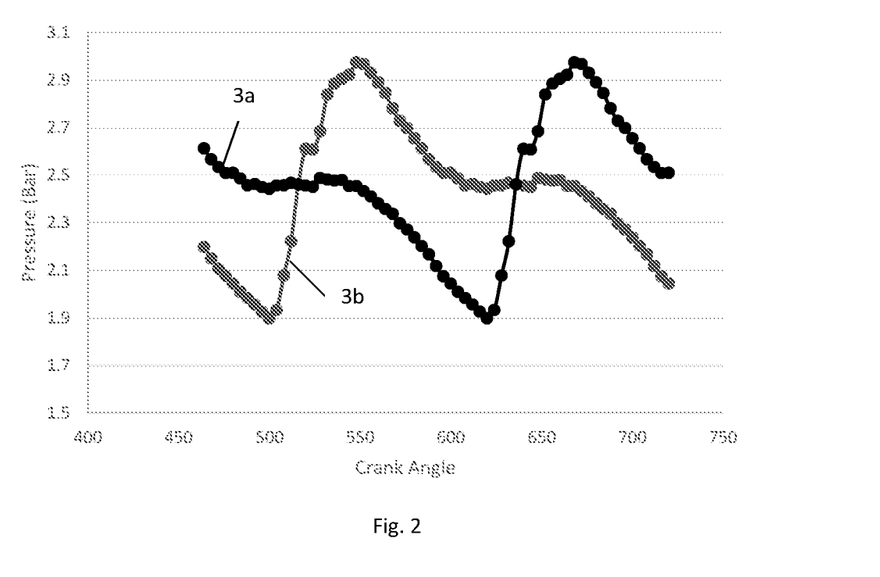
FIG. 2 shows the variation with time of the pressure in two exhaust gas volutes of the turbocharger of FIG. 1.

It is known that through a combustion cycle, the flow entering the exhaust gas inlet volutes 19a, 19b varies. Denoting the velocity of the tips of the blades 9 of the turbine wheel 14 as U, and the spouting velocity of the exhaust gas as c, the velocity ratio U/c (also called isentropic velocity ratio) also varies. FIG. 2 illustrates the variation of the pressures 3a, 3b in the respective two volutes 19a, 19b as a function of the crank angle of a six-cylinder engine, for a range of values of the crank angle from 450 to 720 degrees. Since a full engine cycle for a 4 stroke engine is a 720 degree rotation of the crank angle, and since there are 3 cylinders on either side of the engine manifold, the periodicity of the pressure profile in FIG. 2 is 720/3=240 degrees.

Figure 3:
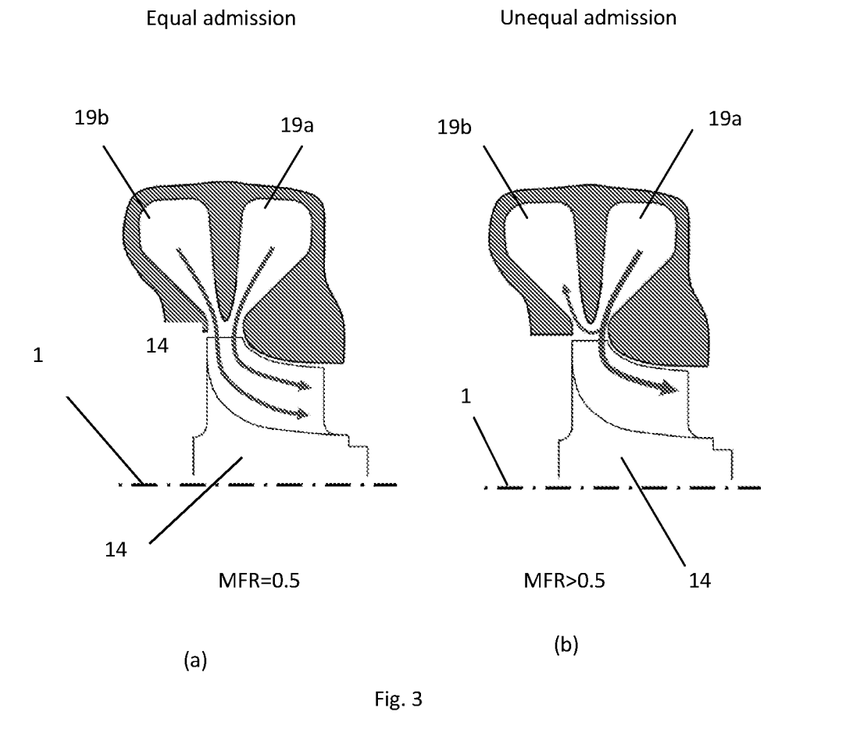
FIG. 3 is composed of FIG. 3(a) and FIG. 3(b) and shows schematically gas flow from the volutes of the turbocharger of FIG. 1 past the turbine wheel.

FIG. 3(a) illustrates the flow from the volutes 19a, 19b towards the turbine wheel 14 when the pressures in the volutes 19a, 19b are equal. The parameter mass flow ratio (MFP) is defined as $$\frac{m_{19a}}{m_{19a} + m_{19b}}$$

where $m_{19a}$ is the mass which flows along volute 19a per second, and $m_{19b}$ is the mass which flows along volute 19b per second. FIG. 3(a) exhibits an MFP of 0.5, which means that both volutes are contributing equally to the mass flow. FIG. 3(b), by contrast, illustrates what occurs when there is a pressure pulse in the volute 19a which means that the pressure is higher than in the volute 19b. In other words there is unequal admission of exhaust gas into the volutes. Exhaust gas from the volute 19a not only passes towards the turbine wheel 14, but also passes to the volute 19b ("recirculation"). Thus the high pressure volute 19a has completely blocked the low pressure volute 19b, and MFR is greater than one. The recirculation causes energy losses.

One way to reduce the risk of circulation would be to form the turbine housing with the tip of the divider wall closer to the turbine wheel. However, this presents challenges for the casting process of the turbine housing.

SUMMARY OF THE INVENTION

In general terms, the invention proposes that a turbine housing defining a pair of volutes with respective outlets divided by a divider wall, includes a diffuser space in the gas flow path between the volutes and the turbine wheel. The diffuser space has a downstream portion having a greater axial extent (that is, a greater length component in the axial direction) than an upstream portion of the diffuser space.

The widening of the diffuser space in the gas flow direction from the volutes to the turbine wheel tends to direct exhaust gas entering the diffusion space from at least one side of the divider wall towards the corresponding axial end of the diffuser space. Thus reduces the tendency of this gas to interrupt the flow into the diffuser space of exhaust gas from the other inlet volute. Thus, the proposed geometry may reduce the risk of recirculation. This is particularly desirable because the recirculation typically occurs at points in the engine cycle at which most energy is available to power the turbine wheel, so improving efficiency at such points leads to a significant efficiency benefit.

As noted above, the turbine housing is of the type defining two exhaust gas inlet volutes. The volutes are preferably not circumferentially spaced from each other (i.e. the turbine is a twin-entry turbine). Preferably the turbine housing is of the kind in which the volutes are symmetrical with respect to a mirror plane perpendicular to the axial direction.

Alternatively the two inlet volutes may be of the double-entry type, in which the volutes are circumferentially spaced from each other, e.g. by 180 degrees, about the rotational axis.

The effectiveness of the diffuser space is dependent upon a number of numerical parameters, which will now be defined:

$D_{divider}$ denotes the distance from the rotational axis to the radially-inner tip of the divider wall.

$D_{wheel}$ denotes the radius of the turbine wheel. That is, the maximum distance of any point on the turbine wheel from the rotational axis.

$D_{min}$ denotes the distance from the rotational axis to the radial position where the axial extent of the diffuser space defining the gas flow passage upstream of the turbine wheel is the least. Note that if the diffuser space is not rotationally symmetric, then $D_{min}$ is defined as the distance from the rotational axis to the radial position where the circumferential-average of the axial extent of the diffuser space is the least.

Optionally, the diffuser space defining the gas flow passage upstream of the turbine wheel may have minimal axial extent at the radially-inner tip of the divider. In this case $D_{divider}$ is equal to $D_{min}$. This allows the diffusion to occur as soon as the two flows meet, which is typically optimal.

Alternatively, $D_{min}$ may be less than $D_{divider}$. Although this means that the diffuser space is not as large, there can still be value in providing an increase in the axial extent of the diffuser space which, along the gas flow direction, begins at a location ($D_{min}$) radially inward of the divider wall.

To ensure that the divider space has a sufficient radial extension to be valuable, numerical simulations have shown that it is desirable that $D_{min}$ is greater than $D_{wheel}+(0.5*(D_{divider}-D_{wheel}))$.

In principle, $D_{divider}$ may alternatively be less than $D_{min}$. In this case the divider wall projects into radially inwardly of $D_{min}$, but this is not presently preferred because it may reduce the effectiveness of the diffuser space. In particular it is presently considered undesirable that $D_{min}$ is greater than $D_{divider}+(0.2*(D_{divider}-D_{wheel}))$.

Further parameters of note are:

$W_{throat}$ is referred to as the wheel inlet throat width, and refers to the axial spacing of the shroud surfaces at the radial position which is $D_{wheel}$ from the rotational axis.

$W_{tip}$ denotes the axial extent of the tips of the blades of the turbine wheel (i.e. the axial component of the length of each tip). In many embodiments, this is substantially equal to $W_{throat}$, i.e. it is $W_{throat}$ minus a very small clearance (e.g. no more than 10 microns) sufficient to ensure that there is no rubbing between them due to machining or casting tolerances.

$W_{min}$ denotes axial width of the diffuser space at the radial position $D_{min}$ from the rotational axis.

$W_{inlet}$ denotes the sums of the respective axial width of the volutes measured at the inner edge of the divider wall, i.e. at the radial position $D_{divider}$. $W_{inlet}$ thus denotes a sum of the axial distances from the tip of the divider wall to the shroud of the turbine housing to either side of the divider wall.

If $D_{divider}$ is equal to $D_{min}$, then $W_{inlet}$ is W equal to $W_{min}$. Even in embodiments in which this is not the case, it is desirable if $W_{min}$ is at least equal to $W_{inlet}*0.7$, and more preferably at least $W_{inlet}*0.8$ or even $W_{inlet}*0.9$.

Note that each of the parameters $D_{divider}$, $W_{throat}$, $W_{min}$ and $W_{inlet}$ are defined as average values over circumferential positions around the rotational axis (that is as "circumferential-averages").

In some embodiments, the turbine housing is circularly symmetric about the rotational axis, to within machining and/or casting tolerances. In this case, $D_{divider}$, $W_{throat}$, $W_{min}$, and $W_{inlet}$ are the circumferential-averages of quantities which are the same in all circumferential positions about the rotational axis.

In other embodiments, however, this is not the case. This is particularly likely to be true in mixed flow/asymmetric turbines.

In either case, since $D_{divider}$, $W_{throat}$ $W_{min}$, and $W_{inlet}$ are defined as circumferential-average quantities, certain areas of the turbine housing can be approximately expressed using them. For example, the inlet area to the diffuser space is approximately $2\pi D_{divider} W_{inlet}$.

A housing-divider-wall-ratio is defined as $$\frac{D_{divider}}{D_{wheel}}.$$

It has been found that this ratio is preferably in in the range 1.05 to 1.2, and may be greater than 1.1. This spacing of the divider wall from the turbine wheel typically makes it possible for the divider wall to be formed by conventional casting.

A throat-to-inlet ratio is defined as $$\frac{W_{throat}}{W_{inlet}}.$$

This ratio may be in the range 1.05 to 1.3. More preferably the ratio is at least 1.1, and/or no greater than 1.2.

$CA_{housing}$ denotes the critical area of the housing.
$CA_{wheel}$ denotes the critical area of the wheel.
The housing-to-wheel-area ratio is defined as $$\frac{CA_{housing}}{CA_{wheel}}.$$

This parameter is typically in the range 0.9 to 1.3, and preferably between 1.1 and 1.3. This parameter is particularly important for applications with high pulsing.

Optionally, as in certain known turbines, vanes may be provided extending substantially axially through the diffuser space. Some or all of the vanes may optionally have a position in the axial direction which is controllable (in this case, if the turbine is part of a turbocharger, the turbocharger is referred to as a "variable geometry turbocharger". Alternatively, some or all of the vanes may be fixed in relation to the surfaces defining the diffuser space.

If vanes are present, a further parameter of the diffuser space is $D_{nozzle}$, which denotes the radius of the radially-inner edge of the vanes. The inner edge of the vane may be defined as the axially-directed line on the surface of the vane which is furthermost in the circumferential direction in which the wheel rotates. $D_{nozzle}$ may be the minimum distance from any point on the vane to the rotational axis. The nozzle-to-wheel-LE (leading edge) ratio is defined as $$\frac{D_{nozzle}}{D_{wheel}}.$$

This value is preferably in the range 1.05 to 1.3.

The invention may be expressed in terms of a turbine comprising the turbine housing, and in terms of a turbomachine such as a turbocharger comprising the turbine.

BRIEF DESCRIPTION OF THE DRAWINGS

A non-limiting embodiment of the invention will now be described, for the sake of example only, with reference to the following figures, in which.

DETAILED DESCRIPTION OF THE EMBODIMENTS

Figure 4:
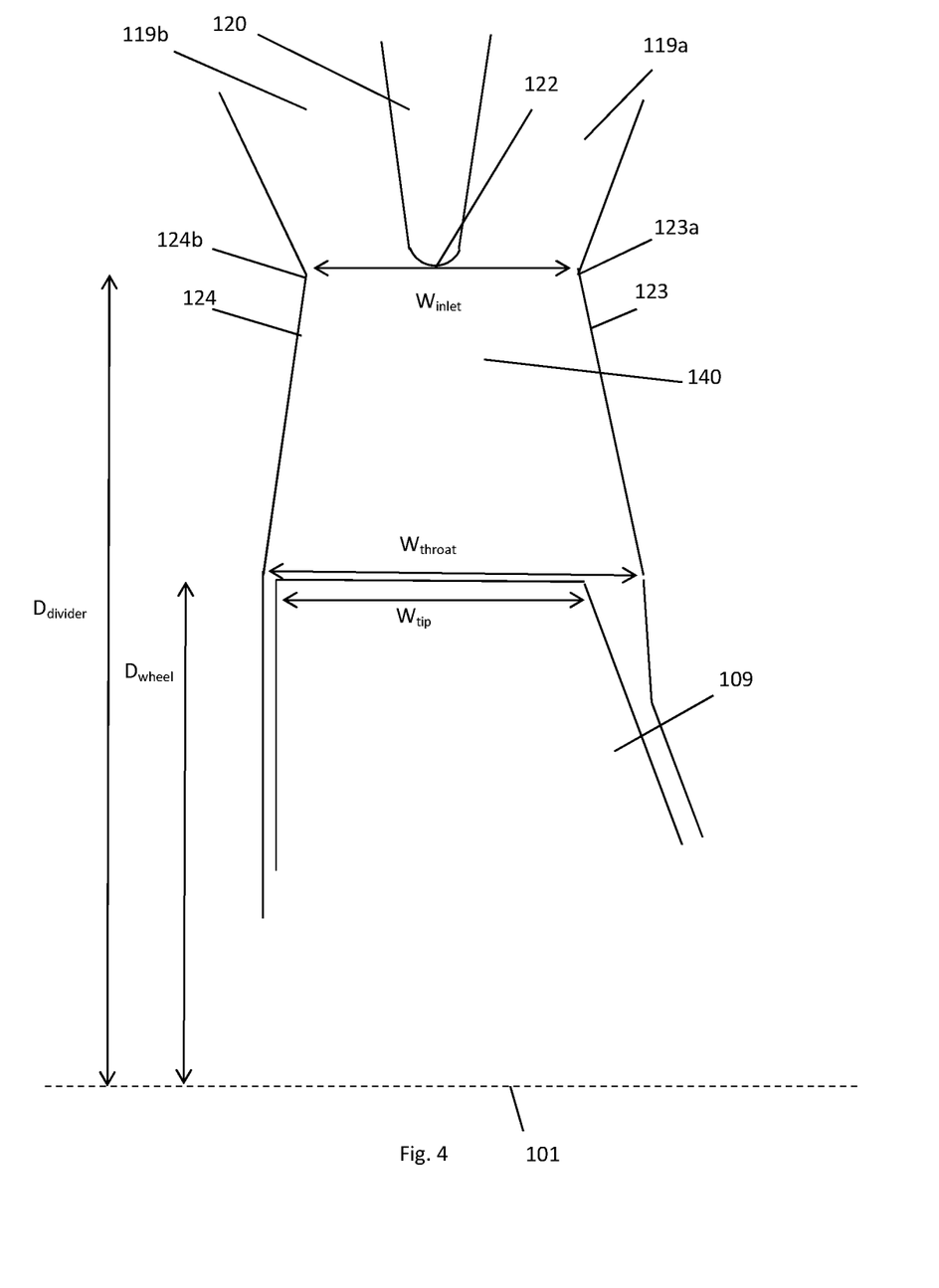
FIG. 4 is a schematic cross-sectional view of a first embodiment of the invention.

An embodiment of the invention will now be described with reference to FIG. 4. In this figure elements corresponding to respective elements of FIG. 1 are denoted by reference numerals 100 higher. The embodiment is a turbine housing with two symmetrical exhaust gas inlets, and a turbine wheel. The gas inlets receive exhaust gas from respective outlet ports of an exhaust manifold of an engine, such as from respective sets of one or more cylinders of the engine. FIG. 4 is a cross sectional view of a portion of the turbine. The turbine wheel is arranged for rotation about an axis 101 which lies in the plane of the cross-section, and is the horizontal direction in FIG. 4. This is referred to as the "axial direction". The turbine wheel includes blades 109. The inlets feed exhaust gas to two respective volutes 119a, 119b arranged in a twin-volute configuration. The volutes have respective openings into a diffuser space 140 defined between two shroud surfaces 123, 124. The volutes 119a, 119b and the diffuser space 140 may be substantially rotationally symmetric about the axis 101.

The diffuser space 140 extends radially inwardly towards the axis 101, and defines a gas flow path from the volutes 119a, 119b to the turbine wheel. In the following description the gas flow direction is assumed to be radially inward in the diffuser space 140, but in reality it may also include a circumferential component in a direction transverse to the plane of FIG. 4.

The volutes 119a, 119b are divided by a divider wall 120 having a radially-inward tip 122. The tip 122 is at a distance $D_{divider}$ from the axis 101. The axial extent of the diffuser space 140 at this radial position is denoted as $W_{inlet}$. This axial extent is the gap between the shroud surfaces 123, 124 at this radial position. In fact, the radial position $D_{divider}$ happens to be the radial position at which the axial extent of the diffuser space 140 is minimal. The shroud surfaces 123, 124 define respective corners 123a, 123b (as viewed in cross-section) which are in radial register with the tip 122 of the divider wall 120.

Each blade 109 of the turbine wheel extends to a respective tip which has a maximum distance from the axis 101 denoted by $D_{wheel}$. The axial extent of the gap between the shroud surfaces 123, 124 at this radial position is denoted by $W_{throat}$. The axial extent of the tip of the blade is denoted by $W_{tip}$ (note that the tip of the blade may also have a longitudinal component in the circumferential direction and/or the radial direction). This is illustrated in FIG. 4 as being significantly less than $W_{throat}$, but in other embodiments $W_{throat}$ and $W_{tip}$ may be substantially equal. For example, $W_{tip}$ may be less than $W_{throat}$ by an amount (e.g. less than 10 microns) selected to ensure that there is clearance between the blade 109 and the surfaces 123, 124 despite machining and casting tolerances in the formation of the turbine housing and the turbine wheel.

The value of $W_{throat}$ is greater than $W_{inlet}$, preferably by a factor in the range 1.05 to 1.3, and more preferably in the range 1.1 to 1.2. The value of the value $$\frac{D_{divider}}{D_{wheel}}$$

is in the range 1.05 to 1.2. In numerical simulations it has been found that, particularly when this condition is met, the gas flows entering the diffuser space 140 from the respective volutes 119a, 119b are drawn to the axial ends of the diffuser space 140, and have a reduced risk of interfering with each other compared to known turbine housings in which there is no diffuser space, or the diffuser space has substantially the same axial extent at all radial positions between the turbine wheel and the volutes.

Note that in this embodiment the shroud surfaces 123, 124 are both substantially flat, as viewed in cross-section, in the range of radial positions between the respective corners 123a, 124a and the radial position $D_{wheel}$ from the axis 101. In this range of radial positions, the shroud surfaces 123, 124 diverge in the radially-inward direction, that is in the direction of radial gas flow. Both the shroud surfaces 123, 124 are inclined to the radial direction (i.e. at an angle to the radial direction which is greater than zero degrees (such as at least 2 degrees)).

Figure 5:
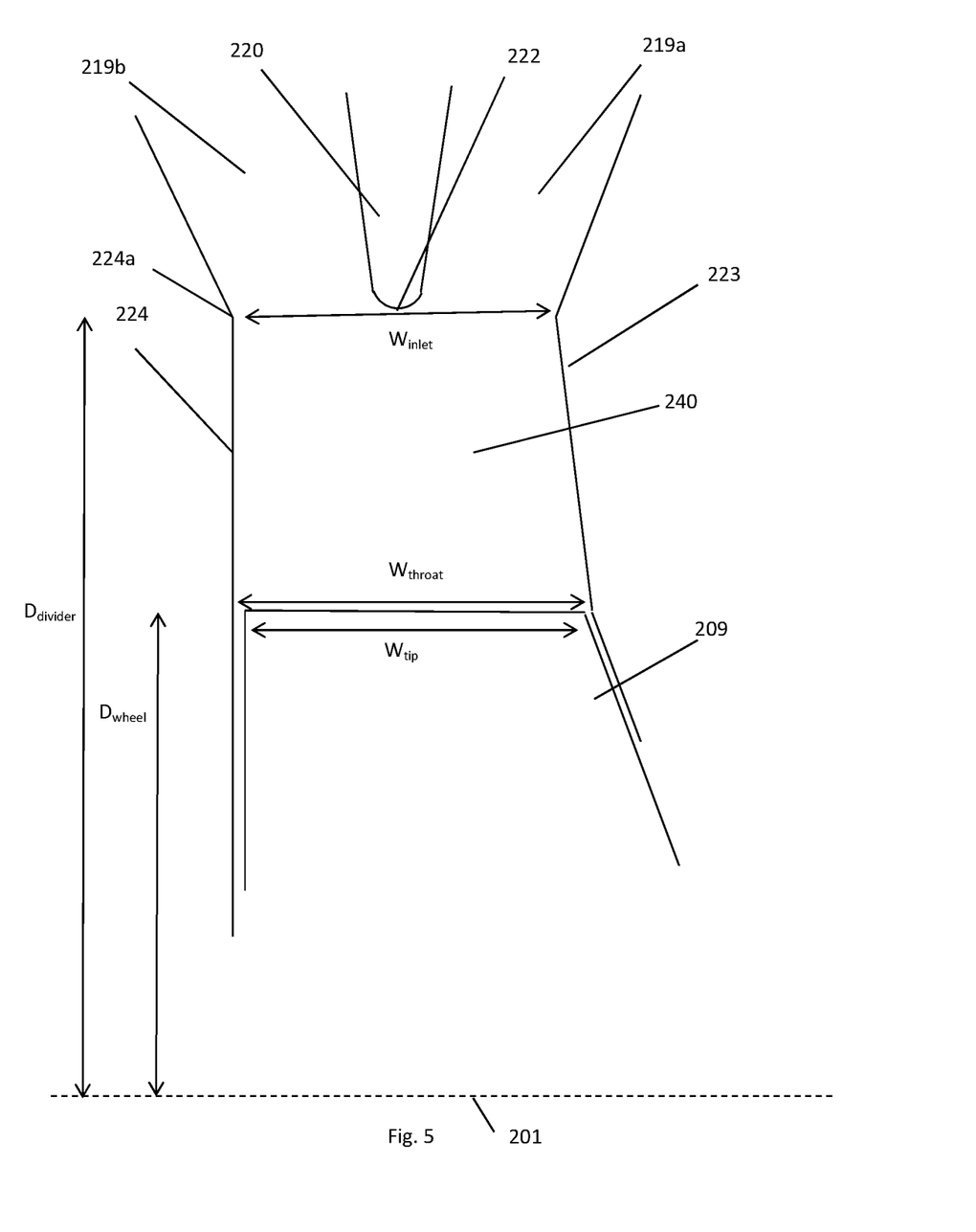
FIG. 5 is a schematic cross-sectional view of a second embodiment of the invention.

Turning to FIG. 5, a second embodiment of the invention is shown. Elements corresponding to those of FIG. 4 are denoted by reference numerals 100 higher. In contrast to the first embodiment, the shroud surface 224 is radial (i.e. includes no component transverse to the rotational axis 201) between the corner 224a and the radial position which is $D_{wheel}$ from the axis 201. Another difference between the embodiments of FIGS. 4 and 5 is that in the embodiment of FIG. 5, the tip of the blade 209 extends across the whole axial extent of the diffuser space 240. That is $W_{tip}$ is substantially equal to $W_{throat}$, less a small clearance space. Although in this embodiment only the shroud surface 223 is inclined to the radial direction, this diffuser space 240 tends to reduce interaction between the gas flow paths of gas entering the diffuser space from the respective volutes 219a, 219b to either side of the tip 222 of the divider wall 220, compared to known arrangements in which there is no diffuser space, or the diffuser space has unvarying axial extent at different radial positions.

Figure 6:
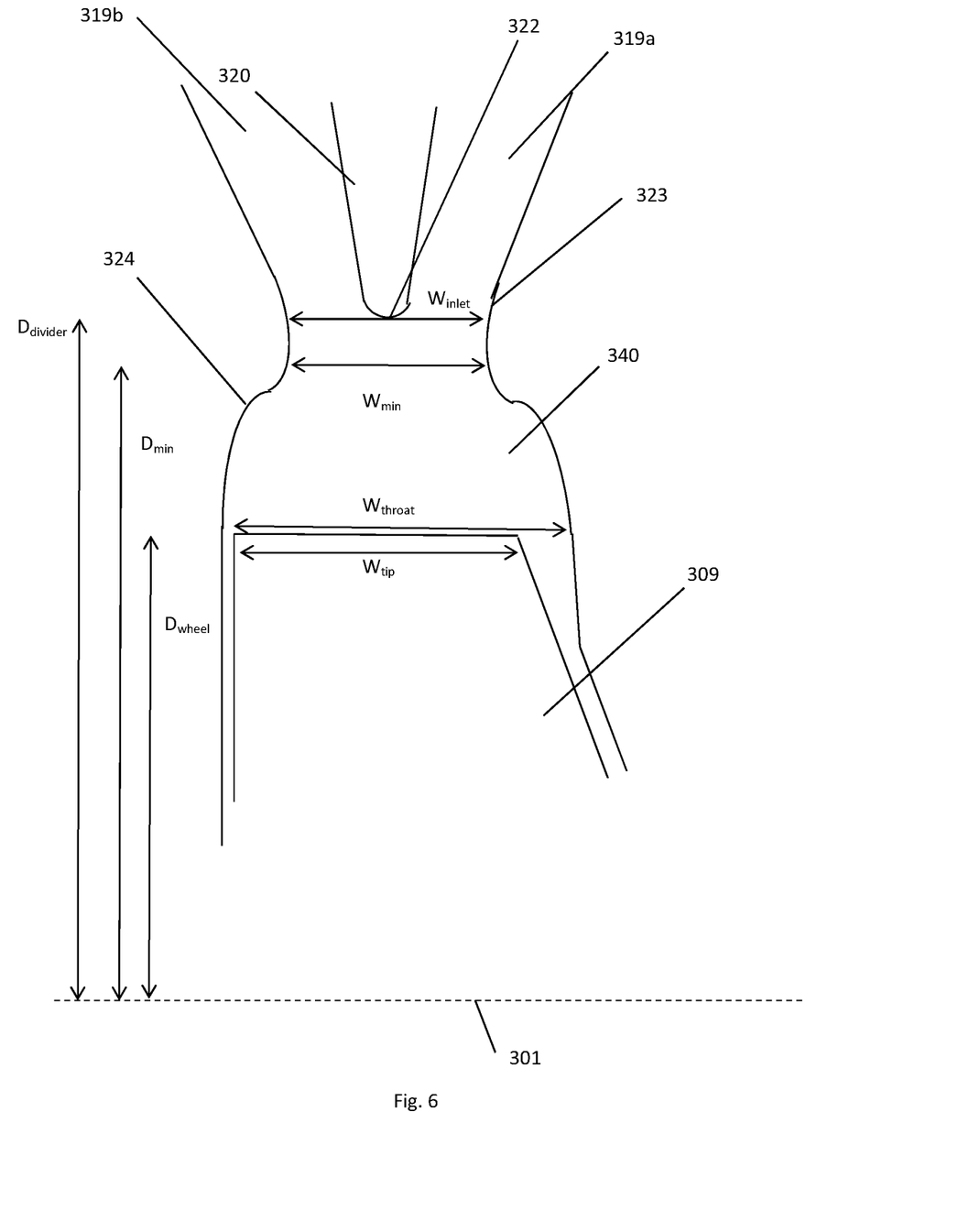
FIG. 6 is a schematic cross-sectional view of a third embodiment of the invention.

FIG. 6 shows a third embodiment of the invention. Elements corresponding to those of FIG. 4 are denoted by reference numerals 200 higher. The shroud surfaces 323, 324 have a minimal mutual spacing (denoted by $W_{min}$) which is at a distance $D_{min}$ from the rotational axis 301. In contrast to the embodiments of FIGS. 4 and 5, $D_{min}$ is different from (and in this case, less than) $D_{divider}$. That is, the radial portion of the diffuser space 340 which has minimal radial extent is closer to the turbine wheel than the tip 322 of the divider wall 320.

$W_{min}$ is at least equal to $W_{inlet}*0.7$, and more preferably at least $W_{inlet}*0.8$ or even at least $W_{inlet}*0.9$. It is desirable that $D_{min}$ is greater than $D_{wheel}+(0.5*(D_{divider}-D_{wheel}))$ Indeed, in variations of the third embodiment $D_{min}$ may be greater than $D_{divider}$.

Also in contrast to FIGS. 4 and 5, the shroud surfaces 323 and 324 are curved, rather than having a sharp corner. Gas streams entering the diffuser space from the respective volutes 319a, 319b are drawn apart as they reach a radial position which is less than $D_{min}$ from the axis 301, and thus have reduced risk of interference.

In all of embodiments of FIGS. 4 to 6, the radial position for which the diffuser space 140, 240, 340 has the maximum axial extent is the one at a distance $D_{wheel}$ from the rotational axes 101, 201, 301. This maximum axial extent is therefore equal to $W_{throat}$. However, embodiments are possible in which this is not the case. In other words, the diffuser space may (in the radially inward direction towards the turbine wheel) become first wider and then narrower.

In all of the first to third embodiments we may define:
$CA_{housing}$ which denotes the critical area of the housing,
$CA_{wheel}$ which denotes the critical area of the wheel; and the housing-to-wheel-area ratio which is defined as $$\frac{CA_{housing}}{CA_{wheel}}.$$

This parameter is typically in the range 0.9 to 1.3, and preferably between 1.1 and 1.3. This parameter is particularly important for applications with high pulsing.

Figure 7:
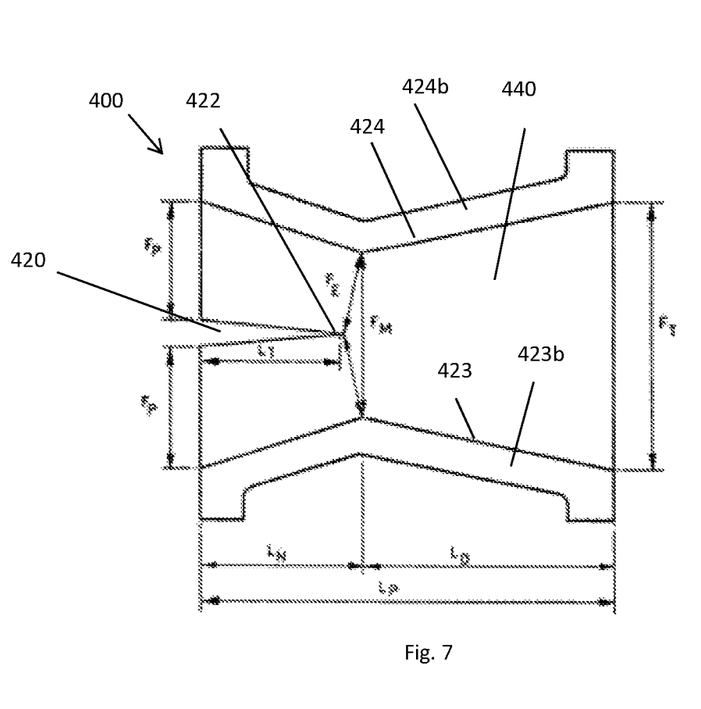
FIG. 7 is a cross-section of an element which can be used to define a diffuser space in an embodiment of the invention.

FIG. 7 depicts a portion of an element 400 which may be used to define the shroud surfaces in an embodiment of the invention. Elements corresponding to respective elements of FIG. 4 are given reference numerals 300 higher. The element 400 is toroidal (ring-like), and is circularly symmetric (excepting the support elements mentioned below) about a symmetry axis which in use is positioned co-incident with the rotational axis of the turbine housing. FIG. 7 shows a cross-section through the element 400 at one angular position (i.e. one circumferential position) about the symmetry axis of the element 400. At this angular position, the element 400 has a radial extent $L_P$.

The element 400 has two inner shroud surfaces 423, 424 which are the inner surfaces of respective walls 423b, 424b. A diffuser space 440 is defined between the shroud surfaces 423, 424. The element 400 also includes a portion 420 which constitutes a divider wall. Note that the portion 420 and the walls 423b, 424b are maintained in the relative configuration shown in FIG. 6 by support elements which are not visible in FIG. 7 because they are not in the plane of the cross-section.

FIG. 7 illustrates various numerical parameters of the element 400. The openings of axial extent $F_P$ which face away from the rotational axis of the turbine, are arranged to receive exhaust gas from respective ones of the volutes. The opening of axial extent $F_T$, which faces towards the symmetry axis of the element 400, is arranged to transmit the exhaust gas towards the turbine wheel. The distance $F_M$ corresponds to $W_{min}$. The distances $F_E$ denote the distance from the tip 422 of the divider wall 420 to the respective points on the surfaces 423, 424 which are separated by a distance $W_{min}$. These points are respective distances $L_D$ and $L_N$ from the radially inner and outer ends respectively of the portion of the element 400 at this angular position, where $L_N+L_D=L_P$.

Many variations of the embodiment are possible within the scope of the invention. For example, the volutes need not be symmetrical with each other.

In another example, the diffuser space may include vanes which project through the diffuser space from one of the shroud surfaces towards the other. Optionally, in the case of the element 400 of FIG. 7, the vanes may be used as the support elements which maintain the relative axial positions of the divider wall 420 and the walls 423b, 424b. Alternatively, in all the embodiments described above, the vanes may be movable axially relatively to the shroud surfaces 123, 124, 223, 224, 323, 324, 422, 424 to selectively open and close the diffuser space under the control of an actuator mechanism.

The invention claimed is:

1. A turbine, comprising:
   a turbine wheel having an axis; and
   a turbine housing defining two volutes, the volutes having respective radially inner openings separated by a radially extending divider wall, the turbine wheel being positioned within the turbine housing for rotation about the axis, and the turbine housing including a diffuser space defined between two shroud surfaces and providing a gas flow path between the volutes and the turbine wheel;
   wherein the diffuser space includes a first portion at a first radial position, the first portion of the diffuser space having a circumferential-average axial extent which is lower than the circumferential-average axial extent of a second portion of the diffuser space at a second radial position, the second portion of the diffuser space being closer to the rotational axis than the first portion of the diffuser space; and wherein:

a circumferential-average distance from the rotational axis to a radially-inner tip of the divider wall is denoted by $D_{divider}$;

a radius of the turbine wheel is denoted by $D_{wheel}$; and the value $$\frac{D_{divider}}{D_{wheel}}$$

is in the range 1.05 to 1.2.

2. The turbine of claim 1, wherein the volutes are symmetrical with respect to each other in a mirror plane perpendicular to an axial direction.

3. A turbocharger including the turbine of claim 1.

4. A turbine, comprising:

a turbine wheel having an axis; and a turbine housing defining two volutes, the volutes having respective radially inner openings separated by a radially extending divider wall, the turbine wheel being positioned within the turbine housing for rotation about the axis, and the turbine housing including a diffuser space defined between two shroud surfaces and providing a gas flow path between the volutes and the turbine wheel;

wherein the diffuser space includes a first portion at a first radial position, the first portion of the diffuser space having a circumferential-average axial extent which is lower than the circumferential-average axial extent of a second portion of the diffuser space at a second radial position, the second portion of the diffuser space being closer to the rotational axis than the first portion of the diffuser sapce; and wherein a circumferential-average distance from the rotational axis to a radially-inner tip of the divider wall is denoted by $D_{divider}$, a radius of the turbine wheel is denoted by $D_{wheel}$, a distance from the axis to a radial position within the diffuser space in which the circumferential-average axial extent of the diffuser space is minimal is denoted $D_{min}$, and $D_{min}$ greater than $D_{wheel}$+ $(0.5*(D_{divider}-D_{wheel})$.

5. A turbocharger including the turbine of claim 4.

6. A turbine, comprising:

a turbine wheel having an axis; and a turbine housing defining two volutes, the volutes having respective radially inner openings separated by a radially extending divider wall, the turbine wheel being positioned within the turbine housing for rotation about the axis, and the turbine housing including a diffuser space defined between two shroud surfaces and providing a gas flow path between the volutes and the turbine wheel;

wherein the diffuser space includes a first portion at a first radial position, the first portion of the diffuser space having a circumferential-average axial extent which is lower than the circumferential-average axial extent of a second portion of the diffuser space at a second radial position, the second portion of the diffuser space being closer to the rotational axis than the first portion of the diffuser space; and wherein a sum of respective circumferential-average axial widths of the volutes measured at a radially-inner tip of the divider wall is denoted by $W_{inlet}$, an axial spacing of the shroud surfaces at the radially-outermost portion of the turbine wheel is denoted by $W_{throat}$, and a throat-to-inlet ratio defined as $$\frac{W_{throat}}{W_{inlet}}$$

is in the range of 1.05 to 1.3.

7. The turbine of claim 6, wherein the throat-to-inlet ratio is at least 1.1.

8. The turbine of claim 6, wherein the throat-to-inlet ratio is at most 1.2.

9. The turbine of claim 6, wherein a circumferential-average axial extent of the diffuser space at a radial position for which the circumferential-average axial extent of the diffuser space is minimal is denoted by $W_{min}$, and $W_{min}$ is at least equal to $W_{inlet}*0.7$.

10. A turbocharger including the turbine of claim 6.

* * * * *